United States Patent
Sa et al.

(10) Patent No.: US 9,856,541 B2
(45) Date of Patent: Jan. 2, 2018

(54) AUSTENITIC HEAT-RESISTANT ALLOY AND METHOD OF MANUFACTURING HEAT-RESISTANT BOLT USING THE SAME

(71) Applicants: Hyundai Motor Company, Seoul (KR); Kia Motors Corporation, Seoul (KR)

(72) Inventors: Bo-Kyung Sa, Kwangju, Kyounggi-do (KR); Ho-Chul Shin, Suwon, Kyounggi-do (KR); Jung-Suk Lee, Yongin, Kyounggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 390 days.

(21) Appl. No.: 14/562,674

(22) Filed: Dec. 6, 2014

(65) Prior Publication Data
US 2015/0259763 A1    Sep. 17, 2015

(30) Foreign Application Priority Data
Feb. 28, 2014 (KR) ........................ 10-2014-0024424

(51) Int. Cl.
| | |
|---|---|
| *C22C 38/50* | (2006.01) |
| *C22C 38/46* | (2006.01) |
| *C22C 38/44* | (2006.01) |
| *C21D 9/00* | (2006.01) |
| *C21D 8/00* | (2006.01) |
| *F16B 33/00* | (2006.01) |
| *C21D 8/06* | (2006.01) |
| *C21D 6/00* | (2006.01) |
| *C22C 38/04* | (2006.01) |
| *C22C 38/02* | (2006.01) |
| *C22C 38/00* | (2006.01) |

(52) U.S. Cl.
CPC ........... *C21D 9/0093* (2013.01); *C21D 6/004* (2013.01); *C21D 8/065* (2013.01); *C22C 38/002* (2013.01); *C22C 38/02* (2013.01); *C22C 38/04* (2013.01); *C22C 38/44* (2013.01); *C22C 38/46* (2013.01); *C22C 38/50* (2013.01); *F16B 33/00* (2013.01)

(58) Field of Classification Search
None
See application file for complete search history.

(56) References Cited

U.S. PATENT DOCUMENTS

| | | | | |
|---|---|---|---|---|
| 3,065,068 A | * | 11/1962 | Reynolds | ................ C22C 38/54 148/326 |
| 3,244,625 A | * | 4/1966 | Silwones | ................ C10M 7/00 106/629 |
| 4,941,341 A | * | 7/1990 | Kellner | ................ B21K 1/56 470/11 |
| 2012/0241051 A1 | | 9/2012 | Imaizumi et al. | |

FOREIGN PATENT DOCUMENTS

| | | |
|---|---|---|
| JP | 1989-025919 B2 | 9/1997 |
| JP | 4975879 B1 | 7/2012 |
| KR | 10-0215531 B1 | 8/1999 |
| KR | 10-2011-0076572 | 7/2011 |

* cited by examiner

*Primary Examiner* — Deborah Yee
(74) *Attorney, Agent, or Firm* — Mintz Levin Cohn Ferris Glovsky and Popeo, P.C.; Peter F. Corless

(57) ABSTRACT

Disclosed are a heat-resistant alloy used in a heat-resistant bolt and the like for fastening high temperature parts of an engine in a vehicle and the like, and a method of manufacturing a heat-resistant bolt using the heat-resistant alloy. Particularly, the austenitic heat-resistant alloy includes, based on a total weight of the heat-resistant alloy, carbon (C) in an amount of about 0.01 to about 0.08 wt %, silicon (Si) in an amount of about 0.01 to about 1.00 wt %, manganese (Mn) in an amount of about 0.01 to about 2.00 wt %, nickel (Ni) in an amount of about 17 to about 22 wt %, titanium (Ti) in an amount of about 2.7 to about 3.2 wt %, chromium (Cr) in an amount of about 11 to about 16 wt %, molybdenum (Mo) in an amount of about 0.3 to about 1.0 wt %, vanadium (V) in an amount of about 0.1 to about 0.4 wt %, and a remainder of iron (Fe) and optionally an inevitable impurity.

5 Claims, No Drawings

AUSTENITIC HEAT-RESISTANT ALLOY AND METHOD OF MANUFACTURING HEAT-RESISTANT BOLT USING THE SAME

CROSS-REFERENCE TO RELATED APPLICATIONS

This application claims priority under 35 U.S.C. §119 to Korean Patent Application No. 10-2014-24424, filed on Feb. 28, 2014, in the Korean Intellectual Property Office, the disclosure of which is incorporated herein by reference in its entirety.

TECHNICAL FIELD

The present invention relates to a heat-resistant alloy used in a heat-resistant bolt and the like for fastening high temperature parts of an engine, and a method of manufacturing a heat-resistant bolt using the a heat-resistant alloy. In particular, the austenitic heat-resistant alloy may be manufactured with reduced manufacturing cost and tensile strength in an elevated temperatures and hardness thereof may be improved by reducing a content of expensive nickel (Ni) element and adjusting contents of other elements, such as chromium (Cr).

BACKGROUND

In accordance with improvement of performance of a vehicle, an engine of the vehicle is located at a highly elevated temperature environment, and thus many parts included in the engine require high durability and the like in the elevated temperature environment. Particularly, many bolts are used in the engine, and use of a material having excellent high temperature characteristics that may endure the elevated temperature environment is required.

For example, a heat-resistant alloy steel, such as SUH660 and SNB16, which contains a large amount of nickel (Ni) or chromium (Cr), and the like, has been developed. Particularly, a 15Cr26Ni1.25Mo alloy, i.e. SUH660, has been widely used. The SUH660 is a precipitation hardening type of heat-resistant alloy steel and has been used as a shaft material in a turbojet engine for aircrafts until now. The SUH660 is also a face-centered cubic austenitic alloy, and has improved tensile strength of about 271 MPa at the elevated temperatures of about 800° C. and thus has improved heat resistance and high temperature characteristics such as formability, weldability, and the like. Accordingly, SUH660 has been used in a heat-resistant bolt for vehicles, special hot tools, and the like.

However, even though SUH660 has the aforementioned advantages, an expensive nickel (Ni) is contained in a content of about 26% and thus the manufacturing cost increases. Further, in accordance with development of an engine technology, a heat-resistant alloy used in the engine is highly desired to endure such elevated temperatures.

The description provided above as a related art of the present invention is just merely for helping understanding of the background of the present invention and should not be construed as being included in the related art known by those skilled in the art.

SUMMARY OF THE INVENTION

The present invention provides technical solutions to improve tensile strength at elevated temperatures, hardness, and the like by setting optimum constituent components and contents for a heat-resistant alloy and optimizing a rolling pressure, a precipitation hardening heat-treatment technology, and the like.

Accordingly, in a preferred aspect, we now provide a Ni/Ti-based material, including a 20% Ni-3% Ti-based material that can exhibit improved tensile strength at elevated temperatures and hardness improved e.g. by up to or in excess of about 10% as compared to a SUH660 heat-resistant material.

Furthermore, in another aspect, the present invention provides an optimum precipitation hardening heat-treatment technology by rejecting the use of nickel (Ni) that is the costly element and controlling other alloy elements.

Accordingly, we now provides a 20% Ni-3% Ti-based material having improved tensile strength at elevated temperatures and hardness improved by about 10% as compared to a SUH660 heat-resistant material in the related art. Furthermore, the present invention provides an optimum precipitation hardening heat-treatment technology by rejecting the use of nickel (Ni) that is the costly element and controlling other alloy elements.

In an exemplary embodiment, the austenitic heat-resistant alloy may include: based on a total weight of the austenitic heat-resistant alloy, carbon (C) in an amount of about 0.01 to about 0.08 wt %, silicon (Si) in an amount of about 0.01 to about 1.00 wt %, manganese (Mn) in an amount of about 0.01 to about 2.00 wt %, nickel (Ni) in an amount of about 17 to about 22 wt %, titanium (Ti) in an amount of about 2.7 to about 3.2 wt %, chromium (Cr) in an amount of about 11 to about 16 wt %, molybdenum (Mo) in an amount of about 0.3 to about 1.0 wt %, vanadium (V) in an amount of about 0.1 to about 0.4 wt %, and a remainder of iron (Fe) and an inevitable impurity.

The present invention also provides the above heat-resistant alloys that consist essentially of, or consist of, the disclosed materials. For example, an alloy is provided that consists essentially of, or consists of, consists essentially of: carbon (C) in an amount of about 0.01 to about 0.08 wt %, silicon (Si) in an amount of about 0.01 to about 1.00 wt %, manganese (Mn) in an amount of about 0.01 to about 2.00 wt %, nickel (Ni) in an amount of about 17 to about 22 wt %, titanium (Ti) in an amount of about 2.7 to about 3.2 wt %, chromium (Cr) in an amount of about 11 to about 16 wt %, molybdenum (Mo) in an amount of about 0.3 to about 1.0 wt %, vanadium (V) in an amount of about 0.1 to about 0.4 wt %, and a remainder of iron (Fe) and an inevitable impurity.

In another exemplary embodiment, provided is a method of manufacturing a heat-resistant bolt, including: a first step of cold forging and then rolling an austenitic heat-resistant alloy to set an exterior diameter, an effective diameter, and a length of the heat-resistant bolt; a second step of heat treating and then air cooling the rolled heat-resistant alloy to improve strength; and a third step of surface treating the air-cooled heat-resistant alloy to manufacture the heat-resistant bolt.

In certain exemplary embodiments, in the first step, the austenitic heat-resistant alloy suitably includes, based on a total weight of the austenitic heat-resistant alloy, carbon (C) in an amount of about 0.01 to about 0.08 wt %, silicon (Si) in an amount of about 0.01 to about 1.00 wt %, manganese (Mn) in an amount of about 0.01 to about 2.00 wt %, nickel (Ni) in an amount of about 17 to about 22 wt %, titanium (Ti) in an amount of about 2.7 to about 3.2 wt %, chromium (Cr) in an amount of about 11 to about 16 wt %, molybdenum (Mo) in an amount of about 0.3 to about 1.0 wt %, vanadium (V) in an amount of about 0.1 to about 0.4 wt %, and a remainder of iron (Fe) and optionallu an inevitable impurity. The austenitic heat-resistant alloy also suitably may consist essentially of, or consist of, the above materials in the above amounts.

In yet certain exemplary embodiments, in the first step, a rolling pressure of the rolling may be in a range of about 45 to about 55 kg/cm$^2$.

In certain exemplary embodiments, in the second step, a heat-treatment temperature of the heat treating may be in a range of about 650 to about 700° C. In addition, in the second step, a heat-treatment time of the heat treating may be about 11 to about 13 hours.

In certain exemplary embodiments, in the third step, the surface treating may be phosphate coating treatment, MoS$_2$ treatment, hardening treatment, or combinations thereof.

In another certain exemplary embodiments, the rolling pressure of the rolling may be about 50 kg/cm$^2$, the heat-treatment temperature of the heat treating may be about 680° C., and the heat-treatment time of the heat treating may be about 12 hours.

In other aspect, a heat-resistant bolt for fastening engine parts in a highly elevated temperature may be manufactured by the aforementioned manufacturing method.

Further provided are engine parts in a vehicle that comprise one or more of the austenitic heat-resistant alloy disclosed herein. Preferred is a heat-resistant bolt in an engine part that comprise the austenitic heat-resistant alloy as disclosed herein.

Other aspects of the invention are disclosed infra.

As described above, according to various exemplary embodiments of the present invention, particularly due to the composition of the heat-resistant alloy, tensile strength in the highly elevated temperatures may be improved. In addition, hardness thereof may be improved by about 10% or greater and a manufacturing cost may be reduced by about 10% as compared to a conventional heat-resistant alloy in the related art by reducing a content of expensive nickel (Ni) element and the like and adjusting contents of other elements.

DETAILED DESCRIPTION

Terms or words used in the present specification and claims should not be interpreted as being limited to typical or dictionary meanings, but should be interpreted as having meanings and concepts which comply with the technical spirit of the present invention, based on the principle that an inventor can appropriately define the concept of the term to describe his/her own invention in the best manner.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

As used herein, an elevated temperature refers to a temperature or a range of temperature which increases above about 100° C., 200° C., 300° C., 400° C., 500° C., 600° C., 700° C., 800° C., or 900° C. The elevated temperature may be reached after an operation of a vehicle part, such as engine. In certain embodiments, the elevated temperature may be about 800° C. or greater, particularly in the engine part.

Hereinafter, the present invention will be described in various exemplary embodiments with reference to Tables and the like.

The present invention provides an austenitic heat-resistant alloy and a method of manufacturing a heat-resistant bolt using the austenitic heat-resistant alloy. In an aspect, the present invention provides an austenitic heat-resistant alloy which may reduce a manufacturing cost and improve strength thereof in a highly elevated temperature.

In the related art, SUH660 or SNB16 containing a large amount of nickel (Ni), chromium (Cr), or the like has been used as a heat-resistant alloy. Particularly, SUH660 has excellent tensile strength of about 296 MPa at the elevated temperature of about 800° C. However, since the SUH660 contains expensive nickel (Ni) element in a content of about 26 wt % based on the total weight of the alloy, the manufacturing cost may increase.

However, in the austenitic heat-resistant alloy according to an exemplary embodiment of the present invention, the content of nickel (Ni) may be reduced by about 20 wt % based on the total weight of the alloy, and the content of titanium (Ti) may increase by about 3 wt %. Accordingly, the manufacturing cost may be reduced and high temperature tensile strength, hardness, and the like may be improved.

In an exemplary embodiment, the austenitic heat-resistant alloy may include: based on a total weight of the austenitic heat-resistant alloy, carbon (C) in an amount of about 0.01 to about 0.08 wt %, silicon (Si) in an amount of about 0.01 to about 1.00 wt %, manganese (Mn) in an amount of about 0.01 to about 2.00 wt %, nickel (Ni) in an amount of about 17 to about 22 wt %, titanium (Ti) in an amount of about 2.7 to about 3.2 wt %, chromium (Cr) in an amount of about 11 to 16 wt %, molybdenum (Mo) in an amount of about 0.3 to about 1.0 wt %, vanadium (V) in an amount of about 0.1 to about 0.4 wt %, and a remainder of iron (Fe) and optionally an nevitable impurity.

As used herein, carbon (C) may improve castability of a molten metal, and further improve castability and tensile strength in an elevated temperature and the like by forming of eutectic carbide with chromium (Cr) and the like. In certain exemplary embodiments, the content of carbon (C) may be in an amount of about 0.01 to about 0.08 wt % based on the total weight of the alloy. When the content of carbon (C) is less than about 0.01 wt %, castability and tensile strength at the elevated temperature and the like may not be improved sufficiently. When the content of carbon (C) is greater than about 0.08 wt %, an effect of increasing content thereof may not be obtained accordingly, thereby increasing the manufacturing cost. In addition, an amount of insoluble carbide may increase, and thus tensile strength at the elevated temperature and the like of the alloy may be reduced.

As used herein, silicon (Si) may be a deoxidized element and improve acid resistance, hardness, high temperature fatigue strength, and the like of the alloy. In certain exemplary embodiments, the content of silicon (Si) may be in an amount of about 0.01 to about 1.00 wt % based on the total weight of the alloy. When the content of silicon (Si) is less than about 0.01 wt %, fatigue strength in an elevated temperature and the like may not be obtained sufficiently. When the content of silicon (Si) is greater than about 1.00 wt %, since compound between metals may be formed simultaneously, stability of a tissue at high temperatures may deteriorate, thereby reducing toughness, ductility, and the like.

Manganese (Mn), as used herein, may fix sulfur (S) which may be inevitably contained in the alloy as sulfide and thus improve hot workability. In addition, manganese (Mn) may form a fine dispersed phase in an alloy tissue during cooling and thus increase tensile strength in an elevated temperature and a fatigue life. In certain exemplary embodiments, the content of manganese (Mn) may be in an amount of about 0.01 to about 2.00 wt % based on the total weight of the alloy. When the content of manganese (Mn) is less than about 0.01 wt %, tensile strength in an elevated temperature and the fatigue life of the alloy may not be improved sufficiently. When the content of manganese (Mn) is greater than about 2.00 wt %, ductility, corrosion resistance, and the like of the alloy may be reduced.

Nickel (Ni), as used herein, may be essential to ensure a stable austenite tissue. Further, nickel (Ni) may improve other physical properties of the alloy in an elevated temperature, and particularly may play a significant role of maintaining an austenite phase at elevated temperatures to increase tensile strength and ductility. In certain exemplary embodiments, the content of nickel (Ni) may be in an amount of about 17 to about 22 wt % based on the total weight of the alloy. When the content of nickel (Ni) is less than about 17 wt %, sufficient heat resistance and the like may not be obtained. When the content of nickel (Ni) is greater than about 22 wt %, economic efficiency may be reduced.

Titanium (Ti), as used herein, may improve physical properties of the alloy at an elevated temperature together with nickel (Ni). Titanium (Ti) may be bonded to nickel (Ni) to form a high temperature reinforcing phase of $Ni_3Ti$ ($\gamma'$) and thus improve heat resistance of the alloy. In certain exemplary embodiments, the content of titanium (Ti) may be in an amount of about 2.7 to about 3.2 wt % based on the total weight of the alloy. When the content of titanium (Ti) is less than about 2.7 wt %, sufficient physical properties at elevated temperatures may not be obtained. When the content of titanium (Ti) is greater than about 3.2 wt %, an effect of increasing content thereof is not obtained accordingly, and thus economic efficiency may be reduced.

Chromium (Cr), as used herein, may basically improve oxidation resistance and the like of the alloy, and suppress a reduction of tensile strength fatigue strength and the like of the alloy at an elevated temperature, which may be caused by reduced nickel (Ni). Accordingly, the content of Cr may improve the tensile strength, the fatigue strength, and the like of the alloy at an elevated temperature. Since a raw material cost of chromium (Cr) is about 10 to about 30% of that of nickel (Ni), the alloy including Cr instead of Ni may improve economic efficiency. In certain exemplary embodiments, the content of chromium (Cr) may be in an amount of about 11 to about 16 wt % based on the total weight of the alloy. When the content of chromium (Cr) is less than about 11 wt %, sufficient tensile strength, high temperature fatigue strength, and the like at an elevated temperature may not be obtained. When the content of chromium (Cr) is greater than about 30 wt %, ferrite may be formed as a matrix tissue of the alloy instead of austenite.

Molybdenum (Mo), as used herein, may increase temper softening resistance of the alloy and provide a solid-solution reinforcing effect. In certain exemplary embodiments, the content of molybdenum (Mo) may be in an amount of about 0.3 to about 1.0 wt % based on the total weight of the alloy. When the content is less than about 0.3 wt %, sufficient temper softening resistance and the like may not be obtained. When the content is greater than about 1.0 wt %, toughness, ductility, and the like of the alloy may be reduced.

Vanadium (V), as used herein, may form stable carbide and the like at elevated temperatures and thus improve strength and the like of the alloy at elevated temperatures. In certain exemplary embodiments, the content of vanadium (V) may be in an amount of about 0.1 to about 0.4 wt % based on the total weight of the alloy. When the content is less than about 0.1 wt %, sufficient improvement of strength at elevated temperatures may not be obtained. When the content is greater than about 0.4 wt %, corrosion resistance at elevated temperatures may be reduced and deterioration in ductility and toughness may be caused.

The austenitic heat-resistant alloy according to various exemplary embodiments of the present invention may have improved tensile strength, fatigue strength, and the like at elevated temperatures. Accordingly, the austenitic heat-resistant alloy may be applied to an engine or turbo charger part and the like, or particularly applied to a heat-resistant bolt for fastening the engine part in elevated temperatures and the like. In an exemplary embodiment, the austenitic heat-resistant alloy may be applied to a heat-resistant bolt for fastening a turbo engine and the like.

Hereinafter, in another aspect, the present invention provides a method of manufacturing an austenitic heat-resistant alloy.

In an exemplary embodiment, a method of manufacturing a heat-resistant bolt by using the austenitic heat-resistant alloy may include steps of: a first step of cold forging and then rolling the austenitic heat-resistant alloy to set an exterior diameter, an effective diameter, and a length of the heat-resistant bolt; a second step of heat treating and then air cooling the rolled heat-resistant alloy to improve strength; a third step of surface treating the air-cooled heat-resistant alloy to manufacture the heat-resistant bolt, and the like.

In certain exemplary embodiments, cold forging, rolling, and the like may be performed before the heat-treatment step in order to easily form a screw thread of the heat-resistant bolt. In other certain exemplary embodiments, the austenitic heat-resistant alloy may include: based on a total weight of the austenitic heat-resistant alloy, carbon (C) in an amount of about 0.01 to about 0.08 wt %, silicon (Si) in an amount of about 0.01 to about 1.00 wt %, manganese (Mn) in an amount of about 0.01 to about 2.00 wt %, nickel (Ni) in an amount of about 17 to about 22 wt %, titanium (Ti) in an amount of about 2.7 to about 3.2 wt %, chromium (Cr) in an amount of about 11 to 16 wt %, molybdenum (Mo) in an amount of about 0.3 to about 1.0 wt %, vanadium (V) in an amount of about 0.1 to about 0.4 wt %, and a remainder of iron (Fe) and an inevitable impurity.

In the first step, the exterior diameter, the effective diameter, and the length of the heat-resistant bolt may be set without limitation. In certain exemplary embodiments, a rolling pressure of the rolling for manufacturing the screw thread of the heat-resistant bolt and the like may be in a range of about 45 to about 55 kg/cm$^2$. When the rolling pressure is less than about 45 kg/cm$^2$, hardness of the manufactured heat-resistant bolt may be substantially reduced to about 35 HRC or less due to reduced work hardening. When the rolling pressure is greater than about 55 kg/cm$^2$, hardness of the manufactured heat-resistant bolt may be reduced substantially to about 35 HRC or less due to processing heat occurring during the rolling.

In certain exemplary embodiments, in the second step, a heat-treatment temperature of the heat treating may be in a range of about 650 to about 700° C. or particularly of about 680° C. When the temperature is less than about 650° C., a solid-solution reinforcing phase of Ni$_3$Ti ($\gamma'$) may not be formed and thus sufficient tensile strength and the like may not be obtained. When the temperature is greater than about 700° C., coarse solid-solution reinforcing phase of Ni$_3$Ti ($\gamma'$) may be formed and thus sufficient tensile strength at elevated temperatures and the like may not be obtained.

In yet certain exemplary embodiments, a heat-treatment time of the heat treating may be about 11 to about 13 hours, or particularly of about 12 hours. When the heat-treatment time is less than about 11 hours, the solid-solution reinforcing phase of Ni$_3$Ti ($\gamma'$) may not be sufficiently formed and thus sufficient tensile strength and the like at elevated temperatures may not be obtained. When the heat-treatment time is greater than about 13 hours, loose solid-solution reinforcing phase of Ni$_3$Ti ($\gamma'$) may be formed and thus sufficient tensile strength and the like at elevated temperatures may not be obtained.

In still certain exemplary embodiments, in the third step, the surface treating may be, but not limited to, phosphate coating treatment, MoS$_2$ treatment, hardening treatment, or the like and the surface treatment may be performed over a surface of the air-cooled heat-resistant alloy after the heat treating in order to maintain physical properties of the heat-resistant alloy, maintain corrosion resistance, wear resistance, and the like, and further suppress burning due to high temperatures and the like.

EXAMPLE

Hereinafter, the present invention will be described in more detail through the Examples. These Examples are only for illustrating the present invention, and it will be obvious to those skilled in the art that the scope of the present invention is not interpreted to be limited by these Examples.

According to various exemplary embodiments, Examples and the Comparative Examples including the contents of the following Table 1 were manufactured by an exemplary manufacturing method of the present invention. The physical properties of the austenitic heat-resistant alloy such as hardness and tensile strength at elevated temperatures according to the rolling pressure, the heat-treatment temperature, and the heat-treatment time were measured to be compared and arranged in the following Table 2.

TABLE 1

| Classification (wt %) | Example 1 | Comparative Example 1 |
|---|---|---|
| C | 0.04 | 0.04 |
| Si | 0.5 | 0.5 |
| Mn | 1.0 | 1.0 |
| P | 0.02 | 0.02 |
| S | 0.02 | 0.02 |
| Cr | 13.0 | 15.0 |
| Ni | 20.0 | 26.0 |
| Ti | 3.0 | 2.0 |
| Mo | 0.7 | 1.3 |
| V | 0.2 | 0.3 |
| Fe | Remainder | Remainder |

In Table 1, compositions of Example 1 according to an exemplary embodiment of the present invention and Comparative Example 1 are shown. As seen in Table 1, a difference in content of nickel (Ni) and titanium (Ti) of Example 1 and Comparative Example 1 is substantially large, and the difference in content may cause different effects in hardness, tensile strength at elevated temperature, and the like in Example 1 and Comparative Example 1.

TABLE 2

| Classification | Rolling pressure (kg/cm$^2$) | Heat-treatment temperature (° C.) | Heat-treatment time (hr) | Hardness (HRC) | High temperature tensile strength (800° C., MPa) |
|---|---|---|---|---|---|
| Example 2 | 45 | 650 | 11 | 39.5 | 282 |
| Example 3 | 45 | 650 | 12 | 39.7 | 289 |
| Example 4 | 45 | 650 | 13 | 39.8 | 287 |
| Example 5 | 45 | 680 | 11 | 41.1 | 288 |
| Example 6 | 45 | 680 | 12 | 41.5 | 291 |
| Example 7 | 45 | 680 | 13 | 41.7 | 289 |
| Example 8 | 45 | 700 | 11 | 41.6 | 290 |
| Example 9 | 45 | 700 | 12 | 41.4 | 286 |
| Example 10 | 45 | 700 | 13 | 41.0 | 284 |
| Example 11 | 50 | 650 | 11 | 41.2 | 287 |
| Example 12 | 50 | 650 | 12 | 41.4 | 290 |
| Example 13 | 50 | 650 | 13 | 41.3 | 291 |
| Example 14 | 50 | 680 | 11 | 42.4 | 294 |
| Example 15 | 50 | 680 | 12 | 42.8 | 296 |
| Example 16 | 50 | 680 | 13 | 42.7 | 293 |
| Example 17 | 50 | 700 | 11 | 41.7 | 291 |
| Example 18 | 50 | 700 | 12 | 41.7 | 290 |
| Example 19 | 50 | 700 | 13 | 41.8 | 288 |

TABLE 2-continued

| Classification | Rolling pressure (kg/cm²) | Heat-treatment temperature (° C.) | Heat-treatment time (hr) | Hardness (HRC) | High temperature tensile strength (800° C., MPa) |
|---|---|---|---|---|---|
| Example 20 | 55 | 650 | 11 | 40.9 | 285 |
| Example 21 | 55 | 650 | 12 | 41.5 | 285 |
| Example 22 | 55 | 650 | 13 | 41.4 | 287 |
| Example 23 | 55 | 680 | 11 | 42.6 | 293 |
| Example 24 | 55 | 680 | 12 | 42.8 | 293 |
| Example 25 | 55 | 680 | 13 | 42.5 | 291 |
| Example 26 | 55 | 700 | 11 | 39.7 | 285 |
| Example 27 | 55 | 700 | 12 | 39.4 | 285 |
| Example 28 | 55 | 700 | 13 | 39.1 | 283 |

As shown in Table 2, hardness and tensile strength at the elevated temperature of about 800° C. are compared after a heat-treatment process including the rolling pressure, the heat-treatment temperature, or the heat-treatment time and the like are applied to Example 1 having the composition in Table 1 to manufacture Examples 2 to 28.

TABLE 3

| Classification | Rolling pressure (kg/cm²) | Heat-treatment temperature (° C.) | Heat-treatment time (hr) | Hardness (HRC) | High temperature tensile strength (800° C., MPa) |
|---|---|---|---|---|---|
| Comparative Example 2 | 45 | 680 | 10 | 35.8 | 260 |
| Comparative Example 3 | 45 | 680 | 14 | 35.4 | 255 |
| Comparative Example 4 | 50 | 680 | 10 | 36.2 | 263 |
| Comparative Example 5 | 50 | 680 | 14 | 36.0 | 261 |
| Comparative Example 6 | 55 | 680 | 10 | 36.5 | 265 |
| Comparative Example 7 | 55 | 680 | 14 | 36.4 | 262 |
| Comparative Example 8 | 45 | 640 | 12 | 37.1 | 264 |
| Comparative Example 9 | 45 | 710 | 12 | 37.6 | 263 |
| Comparative Example 10 | 50 | 640 | 12 | 37.3 | 266 |
| Comparative Example 11 | 50 | 710 | 12 | 37.5 | 269 |
| Comparative Example 12 | 55 | 640 | 12 | 37.5 | 268 |
| Comparative Example 13 | 55 | 710 | 12 | 37.0 | 262 |
| Comparative Example 14 | 44 | 680 | 12 | 35.1 | 270 |
| Comparative Example 15 | 56 | 680 | 12 | 35.5 | 272 |

In Table 3, hardness and tensile strength at the elevated temperature of about 800° C. are compared after the heat-treatment process including the rolling pressure, the heat-treatment temperature, or the heat-treatment time and the like are applied to Example 1 having composition in Table 1 to manufacture Comparative Examples 2 to 15.

As shown in Table 2, the hardness average value of Examples 2 to 28 was about 40.3 HRC which was improved by about 9.4% as compared to about 36.5 that was the hardness average value of Comparative Examples 2 to 15 from Table 3. Further, the tensile strength average value at the elevated temperature of about 800° C. of Examples 2 to 28 was about 288.6 MPa, which was improved by about 8.4% as compared to about 264.3 MPa that was the high temperature tensile strength average value at the elevated temperature of about 800° C. of Comparative Examples 2 to 15 from Table 3. Particularly, among Examples 2 to 28 and Comparative Examples 2 to 15, Example 15 has the greatest hardness and tensile strength at the elevated temperatures.

Accordingly, the austenitic heat-resistant alloy in various exemplary embodiments of the present invention may obtain improved hardness and tensile strength at elevated temperatures as compared to the conventional heat-resistant alloy in the related art. Particularly, when the heat-resistant bolt is manufactured by using the heat-resistant alloy according to an exemplary embodiment of the present invention, the rolling pressure may be about 50 kg/cm², the heat-treatment temperature may be about 680° C., and the heat-treatment time may be about 12 hours.

As described above, the present invention has been described in relation to exemplary embodiments of the present invention, but the embodiments are only illustration and the present invention is not limited thereto. Embodiments described may be changed or modified by those skilled in the art to which the present invention pertains without departing from the scope of the present invention, and various alterations and modifications are possible within the technical spirit of the present invention and the equivalent scope of the claims which will be described below.

What is claimed is:

1. A method of manufacturing a heat-resistant bolt, comprising:
    a first step of cold forging and then rolling an austenitic heat-resistant alloy to set an exterior diameter, an effective diameter, and a length of the bolt;
    a second step of heat treating and then air cooling the rolled heat-resistant alloy to improve strength; and
    a third step of surface treating the air-cooled heat-resistant alloy to manufacture the heat-resistant bolt,
    wherein in the first step, a rolling pressure of the rolling is in a range of about 45 to about 55 kg/cm$^2$, and
    wherein in the second step, a heat-treatment temperature of the heat treating is in a range of about 650 to about 700° C. and a heat-treatment time of the heat treating is about 11 to about 13 hours.

2. The method of claim 1, wherein in the first step, the austenitic heat-resistant alloy includes, based on a total weight of the austenitic heat-resistant alloy, based on a total weight of the austenitic heat-resistant alloy, carbon (C) in an amount of about 0.01 to about 0.08 wt %, silicon (Si) in an amount of about 0.01 to about 1.00 wt %, manganese (Mn) in an amount of about 0.01 to about 2.00 wt %, nickel (Ni) in an amount of about 17 to about 22 wt %, titanium (Ti) in an amount of about 2.7 to about 3.2 wt %, chromium (Cr) in an amount of about 11 to about 16 wt %, molybdenum (Mo) in an amount of about 0.3 to about 1.0 wt %, vanadium (V) in an amount of about 0.1 to about 0.4 wt %, and a remainder of iron (Fe) and an inevitable impurity.

3. The method of claim 1, wherein in the third step, the surface treating is phosphate coating treatment, MoS$_2$ treatment, or hardening treatment.

4. The method of claim 1, wherein a rolling pressure of the rolling is about 50 kg/cm$^2$, a heat-treatment temperature of the heat treating is about 680° C., and a heat-treatment time of the heat treating is for about 12 hours.

5. A heat-resistant bolt for fastening an engine part in an elevated temperature, manufactured by the manufacturing method according to claim 1.

* * * * *